May 29, 1962 I. D. GLAZER 3,036,853

BOTTLE CARRIER

Filed June 12, 1957 4 Sheets-Sheet 1

INVENTOR
Irving D. Glazer

BY Ashley & Ashley

ATTORNEYS

May 29, 1962 I. D. GLAZER 3,036,853

BOTTLE CARRIER

Filed June 12, 1957 4 Sheets-Sheet 2

INVENTOR
Irving D. Glazer

BY Ashley & Ashley

ATTORNEYS

May 29, 1962 I. D. GLAZER 3,036,853

BOTTLE CARRIER

Filed June 12, 1957 4 Sheets-Sheet 3

INVENTOR

Irving D. Glazer

BY Ashley & Ashley

ATTORNEYS

Inventor:
Irving D. Glazer,
By Merriam, Lord & Smith,
Attys.

3,036,853
BOTTLE CARRIER

Irving D. Glazer, Dallas, Tex., assignor to Dura Pak Corporation, Kansas City, Mo., a corporation of Delaware Filed June 12, 1957, Ser. No. 665,284
22 Claims. (Cl. 294—87.2)

Figure 1:
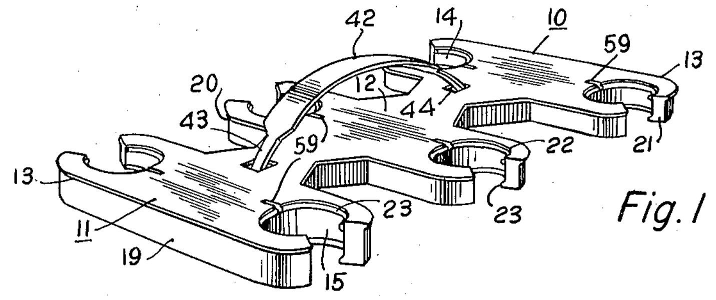

This invention relates to new and useful improvements in bottle carriers.

One object of the invention is to provide an improved bottle carrier which is adapted to suspend bottles by their neck shoulder portions and which is of durable, inexpensive construction capable of being loaded and unloaded automatically or manually and reused many times.

Another object of the invention is to provide an improved bottle carrier having a relatively flat body with sockets at its margins for locating and at least partially gripping bottles by their neck portions to hold the same in spaced relationship, each socket having means coacting with the neck portion of a bottle engaged therein for maintaining the bottle in upright substantially fixed position and in parallel relationship to adjacent bottles.

A particular object of the invention is to provide an improved bottle carrier, wherein each socket is composed of two spaced cooperating integral jaws of resilient material projecting from the body of the carrier with the end portions of the jaws being relieved or in spaced apart opposing relationship to facilitate relative swinging movement of the bottles upon manual insertion and removal thereof.

An important object of the invention is to provide an improved bottle carrier, having lateral arms with a socket at the end of each arm, each socket having coacting spaced apart jaws at the outer portions thereof, said socket, including the jaws, having a vertical integral collar forming an inside socket wall adjacent to which the neck portion of a bottle is located and held in cooperation with the jaws, the arms being coextensive with the jaws for reinforcing the socket.

Another object of the invention is to provide an improved bottle carrier wherein the sockets may be relieved opposite their jaws to increase the flexibility of the jaws and facilitate insertion and removal of bottles therebetween.

A further object is to provide a pack carrier for reduced neck bottles comprising an integrally molded substantially rigid frame of thin flexible elements having peripheral bottle neck receiving and engaging socket portions.

Another object is to provide a molded bottle carrier in which the bottles are supported and held by the neck largely by frictional socket gripping means and the same material is used to form both the body of the carrier and in which the gripping means forms an integral molded part of the carrier.

Another object is to provide a bottle carrier which utilizes a minimum of material yet is strong, light and rugged.

A further object of the invention is to provide an improved bottle carrier, which may be economically constructed of rubber, a plastic, particularly polyethylene, or other material having sufficient rigidity and resiliency, and which carrier may have a skeleton body or frame for increasing the flexibility of the jaws of the sockets and reducing the quantity of the material used in its manufacture.

A construction designed to carry out the invention will be hereinafter described, together with other features of the invention.

Figure 4:
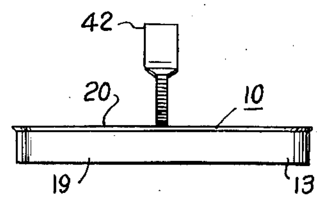
Figure 2:
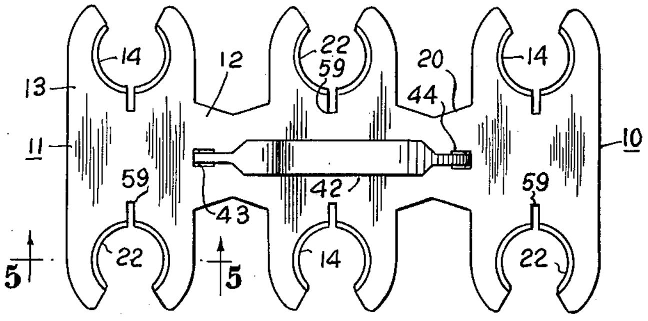
Figure 5:
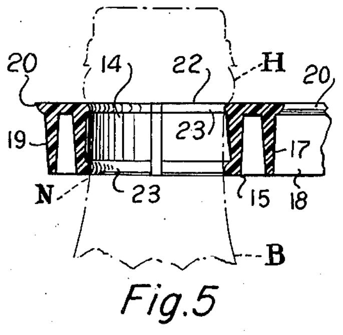
Figure 3:
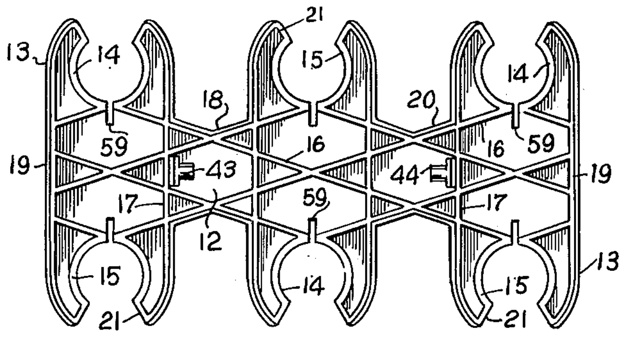
Figure 6:
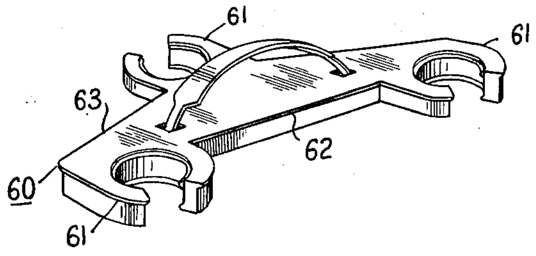
Figures 7, 8, 9, 10, 11, 12, 13, 14:
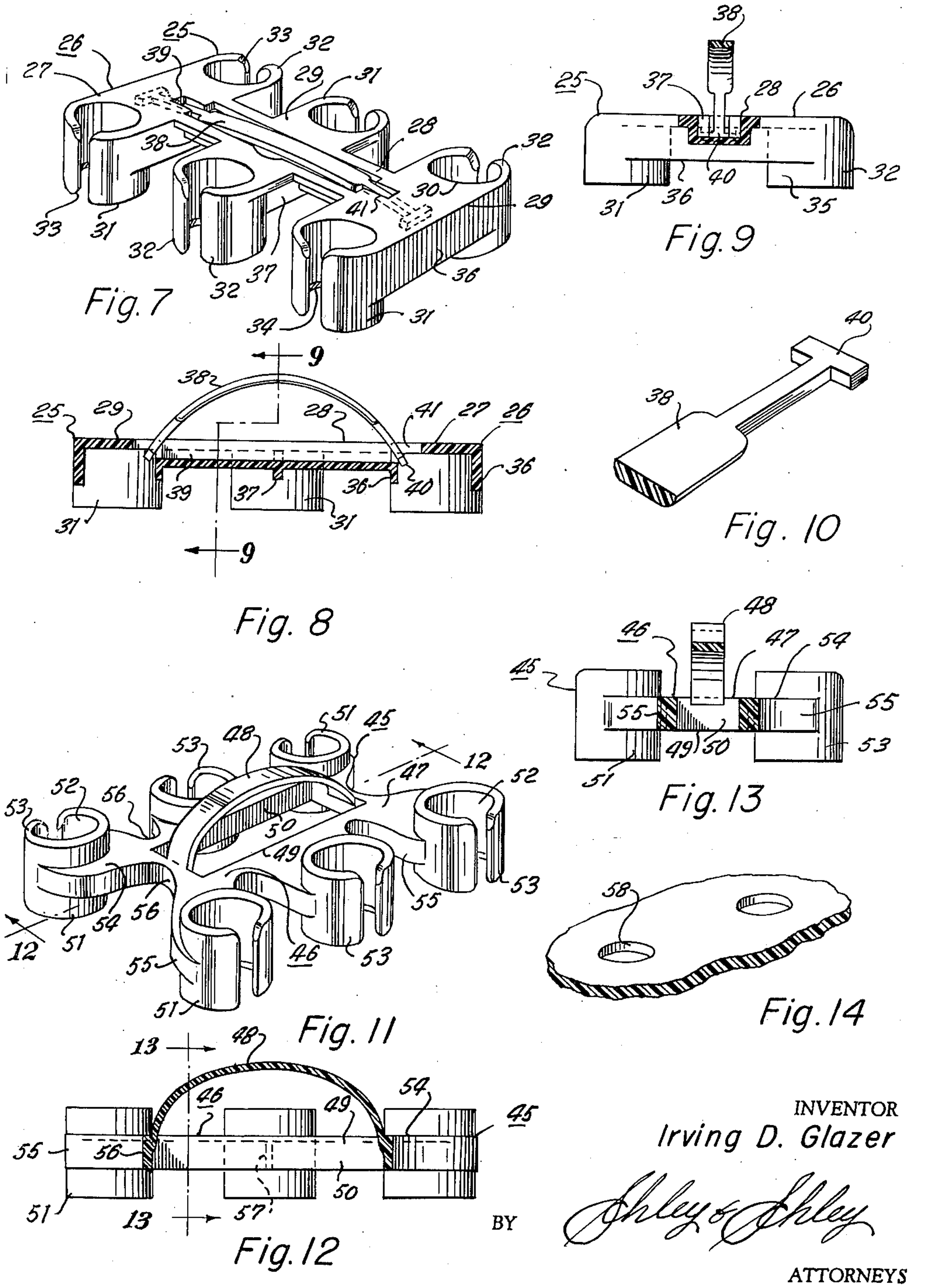
Figure 15:
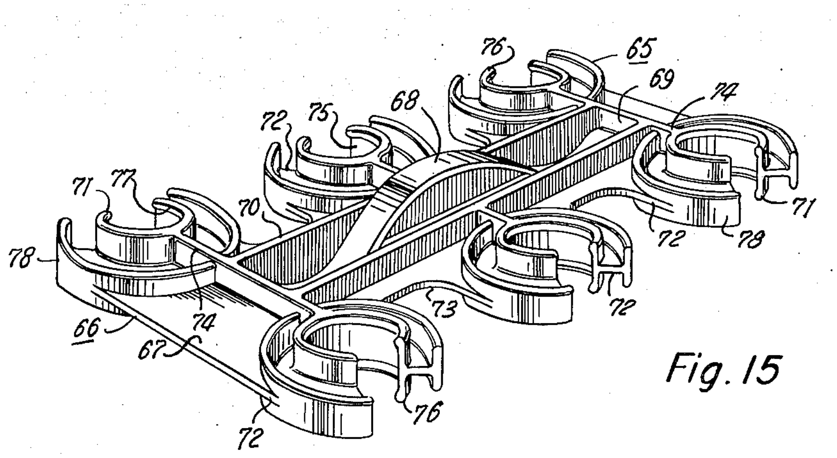
Figure 16:
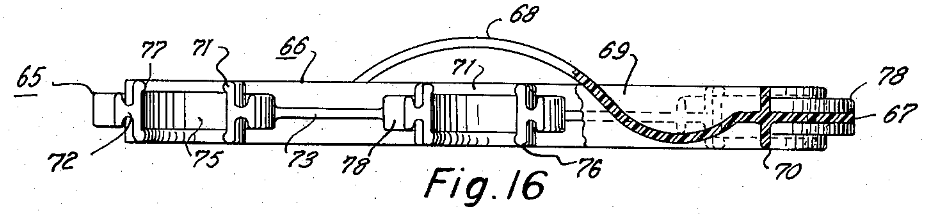
Figure 17:
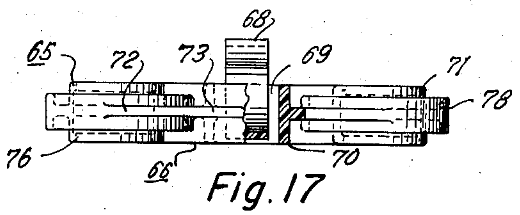
Figure 18:
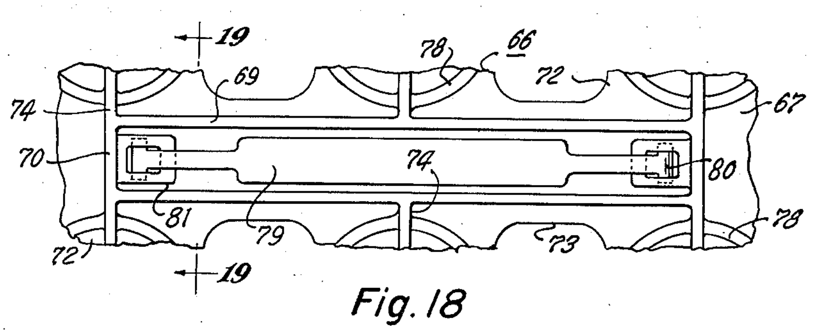
Figure 19:
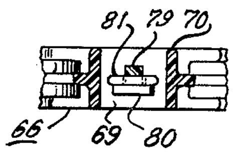

The invention will be more readily understood from a reading of the following specification and by reference to the accompanying drawings, wherein examples of the invention are shown and wherein:

FIG. 1 is a perspective view of a bottle carrier constructed in accordance with the invention, FIG. 2 is a top plan view of the carrier, FIG. 3 is a bottom plan view of the carrier, FIG. 4 is an end elevational view of the carrier, FIG. 5 is a transverse, vertical, sectional view, taken on the line 5—5 of FIG. 2, FIG. 6 is a perspective view of a slightly modified carrier, FIG. 7 is a perspective view of a modified carrier, FIG. 8 is a longitudinal, vertical, sectional view of the modified carrier, FIG. 9 is a transverse, vertical, sectional view, taken on the line 9—9 of FIG. 8, FIG. 10 is a perspective view of a portion of the handle of the modified carrier, FIG. 11 is a perspective view of another modified carrier, FIG. 12 is a longitudinal, vertical, sectional view, taken on the line 12—12 of FIG. 11, FIG. 13 is a transverse, vertical, sectional view, taken on the line 13—13 of FIG. 12, FIG. 14 is a perspective view of a portion of a carrier having finger gripping holes, FIG. 15 is a perspective view of another modified carrier, FIG. 16 is a side elevational view, partly in section, of the carrier shown in FIG. 15, FIG. 17 is an end elevational view, partly in section, of the carrier shown in FIG. 15, FIG. 18 is a plan view of a portion of the carrier having a modified handle, FIG. 19 is a transverse, vertical, sectional view, taken on the line 19—19 of FIG. 18.

Figure 20:
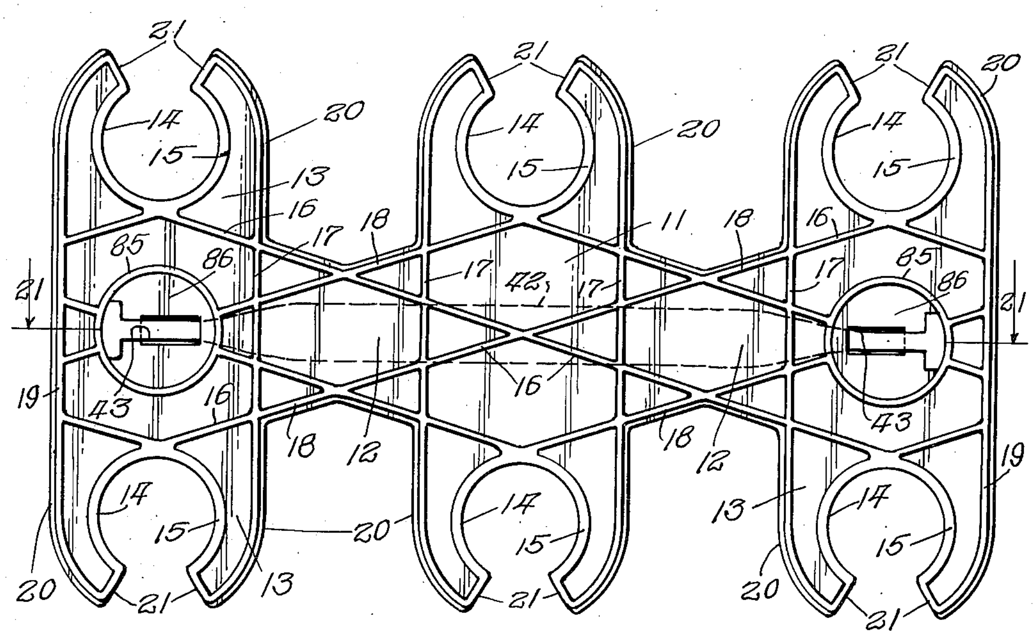
Figure 21:
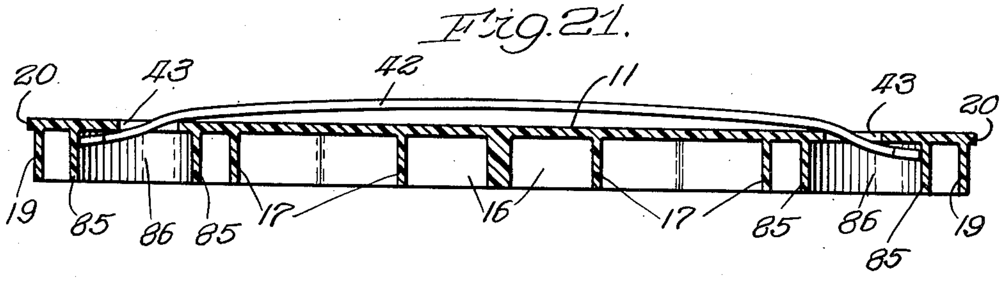
Figure 22:
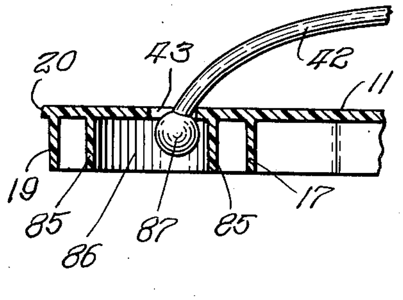

FIG. 20 is a bottom plan view of a modified carrier having reinforced wells for the handle or bail ends, FIG. 21 is a section taken at 21—21 of FIG. 20, and FIG. 22 is a section similar to FIG. 21 of a portion of a carrier showing a modified handle end.

This application is a continuation-in-part of my copending application, Serial No. 559,293, filed January 16, 1956, now Patent No. 2,871,055, dated Jan. 27, 1959, and is a continuation-in-part of my copending application, Serial No. 629,769, filed December 18, 1956, now abandoned.

In the drawings, the numeral 10 designates the substantialy flat, substantially rectangular body of a bottle carrier which is adapted to be formed of rubber, plastic such as polyethylene, or other suitable elastic or resilient material having sufficient rigidity and durability. The body is of ribbed, recessed, light-weight construction and includes a relatively-thin (1/16–3/32 inch), substantially flat top member or plate 11 of spaced but connected triple H shape having a longitudinal, medial portion 12 and spaced, lateral or transverse arms or portions 13 at its longitudinal margins in opposed, parallel relationship. Circular openings or annular sockets 14 are formed at the ends of the arms 13 and the sockets are surrounded by substantially annular collars or flanges 15 which project vertically, and generally downwardly, from the top plate 11 to form well-like sockets (FIG. 3).

In order to increase the rigidity of the body and its arms, thin (1/16–3/32 inch) reinforcing flanges, elements, or ribs 16 project downwardly from the top plate 11 and join the inside of the collars 15. For best results the thin ribs 16 run in diagonal relationship and intermittently intersect similar ribs. Additional thin projecting, generally downwardly, flanges or ribs 17 generally extend entirely across the underside of the plate 11 to the longitudinal margins of the arms 13 and intersect the ribs 16 which intersect one another at spaced points. The portions of the diagonal ribs between the spaced apart arms provide sides or edges 18 for the medial portion 12 of the body, while the cross ribs at the ends of said body form sides or edge portions 19 therefor (FIG. 4). Preferably, the portions of the ribs at the margins of the body are spaced inwardly thereof to provide a reinforcing bead or lip 20 which is coextensive with said margins. As will be apparent, the ends of the ribs 17 and 19 are connected to the ends of the socket collars 15 by complementary end members 21 which conceal the spaces therebetween, the end portions of said ribs being substantially coextensive with said collars. The jaws so formed are channel shaped, being open at the bottom and closed at the end 21.

Each socket 14 is of a diameter substantially equal to the diameter of the neck portion N of a bottle B to be engaged in and supported by the socket (FIG. 5). The socket collar has a bevel or chamfer 22 at its upper end to facilitate insertion and removal of the bottles (FIGS. 1 and 2) and for providing a resting region for the neck-shoulder of any bottle which is adapted to be held. For maintaining the bottles in upright, parallel relationship, internal, radial beads, rings or annular shoulders 23 are formed at the upper and lower ends of each socket and provide spaced bottle-locating and gripping surfaces for the bottle neck portion (FIGS. 3 and 5). A pair of spaced, flexible, coacting elements or jaws 24 is provided at the outer portion of each socket by interrupting or cutting away the medial outer portion of its arm 13 and collar 15. The end members 21 are disposed at the ends of the jaws 24 and diverge outwardly into an expanded mouth to assist manual insertion and removal of the bottles by relative swinging movement thereof through the jaws of the mouth and into the socket.

The carrier as described will be seen to have a thin top body, plate or element 10 with projecting arms and an open jawed socket opening at the end of each arm with a thin element or flange vertically connected completely about the edges of the top plate. The gripping means of the socket thus formed is comprised of cooperating channeled jaws open at the bottom and closed at the extremities.

Although not essential, a small radial slot or narrow opening 59 may be cut or otherwise formed in the inner medial portion of each socket opposite, preferably diametrically, the mouth opening between its jaws 24 to increase the flexibility of the jaws and permit the use of slightly more rigid material.

A handle 42, of plastic, rubber, polyethylene, or other suitable material, extends longitudinal to the medial portion 12 of the top plate 11 and has a reduced, T-shaped cross-head or yoke 43 at each end (FIGS. 1–3). The top plate has suitable openings 44 for receiving and confining the cross-heads 43. The handle 42 is preferably held at each of its extreme ends beneath the plane of the body member 11 by means of a ball 87. In assembly the ball is forced through the opening 43 and then, when so secured, the handle or bail provides at each end of the carrier, when lifted, a lifting force effective at widely spaced regions. By providing the support for lifting the carrier from its outer regions when it has a bottle-load therein it is apparent that the body structure could be severely strained, since the weight of any carried bottle-load would place the complete body member, which is extremely thin, in tension and cause any compression forces to be absorbed by the cross ribs. By providing spaced-apart lifting points for the carrier, the bottle weight on the carrier has a less serious effect upon the carrier structure. The complete body member is, in effect, supported as a beam with two spaced support members, much as would be a cantilever bridge. The result is that the body itself, at times when it is lifted and carrying a bottle-load, is placed in compression and the tension forces are then effective in the strengthening ribs. The overall strength of the body to sustain a heavy bottle-load is thus greatly improved.

The bottles B are adapted to be suspended from the carrier body 10 by engagement of the neck portion N of each bottle or neck-shoulder with one of the sockets 14, whereby the bulbous head H of each bottle projects above the socket and rests upon the top plate 11. Due to the flexibility of the jaws 24, the bottles may be inserted and removed by relative longitudinal vertical movement between the body and bottles so as to permit machine loading and unloading of the carrier over the top of the bottle. Also, the flexibility of the jaws permits insertion and removal of the bottles by pivotal or swinging movement of each bottle relative to one of the sockets and the jaws thereof, whereby said jaws are spread or flexed outwardly to accommodate the neck portion of the bottle and its engagement with and disengagement from said socket. It is noted that the collars 15 are of sufficient depth or length and space the annular shoulders 23 apart to positively grip the neck portions of the bottles and stabilize said bottles against displacement or relative movement.

A slightly modified carrier is shown in FIG. 6 and includes a body 60 similar to the body 10 but having three sets of arms 61 instead of six. This carrier is adapted to support larger bottles, such as quarts, and its body has two sets of end arms on one side and a central or medial set of arms on the opposite side. Since the thin elements of the carrier body 60 are substantially identical to the elements of the body 10, it is believed unnecessary to describe the same in detail. Preferably, however, the longitudinal margin 62 of the body opposite its medial arm extends longitudinally and rectilinearly between the end arms and the margins 63 adjacent the medial arm are rectilinear and converge toward said medial arm.

In FIGS. 7–10, a modified carried body 25 is shown and includes a skeleton frame 26 of ribbed, recessed construction and formed of suitable elastic or resilient material having sufficient rigidity and durability. The frame 26 has a substantially flat, relatively-thin top member or plate 27 of spaced but connected triple H shape which includes a longitudinal, medial portion 28 and spaced, lateral or transverse arms or portions 29. Sockets 30 and collars 31, similar to the sockets 14 and collars 15, are formed at the ends of the arms 29 and have similar jaws 32 which are bevelled or chamfered at the upper and lower ends of their longitudinal edges as shown by the numeral 33 to facilitate manual insertion and removal of bottles. Automatic loading of the carrier is aided by providing an internal bevel or chamfer 34 at the lower each of each collar. The outside of each end arm is reinforced and its collars 31 are connected by depending, marginal flanges or ribs 36 which are similar to the end flanges 19 but which terminate above the lower ends of the collars. Although the intermediate arm may be reinforced in the same manner, a medial reinforcing rib 37 may be employed (FIGS. 7 and 8). A handle 38 is recessed within a channel or groove 39 extending longitudinally of the top medial portion 28 and has a reduced, T-shaped cross-head or yoke 40 at each end (FIG. 10). As shown at 41, the ends of the groove 39 are of reduced width and extend into the end arms 29 so as to provide reduced openings for receiving and confining the cross-heads 40.

Another modified carrier body 45 is shown in FIGS. 11–13 and includes a skeleton frame 46 similar to the frame 26 and having a similar top plate 47. A handle 48 projects upwardly from the ends of an elongated opening or slot 49 extending longitudinally of the top plate 47 and having reinforcing flanges or ribs 50 depending from its margins. For supporting collars 51, which are identical to the collars 31 and have identical sockets 52 and jaws 53, the frame 46 has a plurality of lateral arms or transverse elements 54 extending therefrom in spaced relation. Reinforcing ribs or flanges 55 depend from the margins of the arms and extend around substantially one-half of the collars 51, having their inner end portions made integral with the flanges 50 of the opening 49 and with the flanges of adjacent end arms as shown at 56. Due to this arrangement, relatively deep recesses are provided between adjacent arms. As shown by the broken lines 57 in FIG. 12, one or more transverse, reinforcing ribs may extend between the collars and flanges 50. It is noted that the collars preferably extend above as well as below the plate 47 whereby the flanges 55 are disposed at the medial portions of said collars. If desired, a pair of finger grip openings 58 (FIG. 14) may be formed in any one of the top plates 11, 27 or 47 and substituted for the handles 42, 28 or 48 as handle means for the carrier bodies 10, 25 or 45.

A further modified carrier body 65 is shown in FIGS. 15–17 and includes a skeleton frame 66 similar to the frame 46 and having a similar thin element or medial plate 67. A flexible handle 68 projects upwardly from an elongated opening or slot 69 extending longitudinally of the medial portion of the plate 67 and having a thin upright, marginal flange 70 extending above and below said plate. Due to its flexibility, the handle 68 readily flexes upwardly when it is grasped and downwardly when it is released. For supporting thin collars 71 in opposed relationship, the plate 67 has a plurality of lateral arms or transverse elements 72 which are formed by recessing the longitudinal margins of said plate as shown at 73. A thin transverse reinforcing flange or rib 74 connects the inner medial portion of each collar 71 to the marginal flange 70 of the opening 69, with the ribs of the end collars being aligned with and forming continuations or extensions of the end portions of marginal flange 70.

Each collar 71 has an axial bore or socket 75 and coacting jaws 76, similar to the sockets and jaws of the other embodiments of the invention, and internal, annular shoulders or radial beads 77 are formed at the upper and lower ends of each socket. The margins of the shoulders 77 are beveled or chamfered and said shoulders provide spaced gripping surfaces for engagement with the neck portion of a bottle. Since the neck portions of many bottles vary in contour and have slight irregularities, the sockets need not conform completely to the shape of said neck portions due to the gripping contact of the spaced shoulders. It is noted that the outer portions of the arms 72 are arcuate and coextensive with the collars 71 and their jaws 76. Arcuate, marginal flanges 78 are provided for reinforcing the arm ends and collars and surround the collars in spaced relationship, being coextensive therewith and having their inner end portions connected to the ribs 74. As shown, the flanges 78 may be of less depth than the collars, ribs 74 and flange 70 which are of the same width. If desired, the carrier body may be provided with a detachable handle 79 similar to the handles 42 and 38 and having a similar cross-head or yoke 80 at each end (FIGS. 18 and 19). An apertured lug or tab 81 may extend inwardly from each end of the opening 69 for receiving and confining the cross-heads 80.

The carrier shown in the bottom plan view of FIGS. 20 and 21 is similar to the carrier of FIG. 3 except that the handle or bail ends are secured to the body 10 in the outer arms 13 rather than in the medial portions 12. Also the bail ends are inserted through slots 43 in the top 11 located in an area circumscribed by thin reinforcing annular flanges 85 which form bail end wells 86.

FIG. 22 shows a modified handle or bail end in the shape of a ball 87 which can be forced into a slot or hole of somewhat smaller size in the top 11 having a reinforced bail well 86 as described above.

The foregoing description of the invention is explanatory thereof and various changes in the size, shape and materials, as well as in the details of the illustrated construction, may be made, within the scope of the appended claims, without departing from the spirit of the invention.

What is claimed is:

1. A carrier for bottles of the enlarged neck-shoulder type comprising a substantially flexible and resilient sheet forming a main body and having a plurality of pairs of integrally formed outwardly extending arms, the arms of each of said pairs having their adjacent peripheral configuration of complementary concave shape with the outer ends approaching each other to within a distance less than the smallest dimension of the neck adjacent to the shoulder of any bottle adapted to be held, the adjacent edges of the arms of each pair thus being adapted to form a socket substantialy conforming to the cross-sectional periphery of the bottle neck, a flange section also formed integrally with the sheet and the outwardly extending arms and depending therefrom in a plane substantially perpendicular to the plane of the body and the outwardly extending arms to provide lateral stiffness in each while retaining pliability of the arms to an extent sufficient to accommodate entry of a bottle within each formed socket with the arms becoming cantilever members to support the weight of bottles positioned within the formed sockets.

2. A carrier for bottles of the cap-sealed type comprising a substantially flexible and resilient sheet forming a main body and having a plurality of pairs of integrally formed arms extending outwardly therefrom, the peripheral shape of the arms of each of said pairs being complementary and concave relative to each other with the outer ends approaching each other to within a distance less than the smallest dimension of any bottle adapted to be held so that an open-end socket substantially conforming to the bottle neck to be held is formed, a flange section depending from approximately the peripheral edges of each of the body and the outwardly extending arms in a plane substantially perpendicular thereto to provide lateral stiffness to each of the body and arms with the arms remaining sufficiently pliable to accommodate entry of a bottle between their ends and into the formed socket with the flanges being sufficiently rigid to provide cantilever bottle-supports extending from the body for supporting the weight of a bottle positioned within the socket.

3. The carrier claimed in claim 2 comprising, in addition, a multiplicity of criss-cross ribs integrally formed with the body, arms, and flanges and extending outwardly from the body in the same direction as the flanges and each extending along the body with the ends terminating at spaced-apart flange regions to provide both lateral and longitudinal stiffening.

4. A carrier for bottles having an enlarged shoulder at the upper end of the neck comprising a substantially flexible and resilient sheet forming a main body and having a plurality of pairs of integrally formed arms extending outwardly therefrom, the arms of each of said pairs being of complementary shape with the outer ends approaching each other to within a distance less than the smallest neck-dimension of any bottle adapted to be held and having the adjacent edges of the arms of each pair of a configuration to form a socket substantially conforming to the bottle neck to be held, a substantially flexible and resilient flange section integrally formed with the body and arms and depending from each in a plane substantially perpendicular to the plane of the body and arms to provide lateral body and arm stiffness and arm pliability to an extent sufficient to accommodate entry of a bottle within each formed socket, the lateral arm stiffness and rigidity insuring from the arms a cantilever bottle-locating section adequately strong to support the weight of bottles so-positioned, and a bottle wall contacting shoulder formed at substantially the upper and lower portions of the depending flange-bounding adjacent edges of each formed bottle-gripping socket to provide bottle-wall positioning at spaced points along the bottle neck to be held.

5. A carrier for bottles comprising a plastic sheet forming a main body and having a plurality of pairs of integrally formed arms extending outwardly therefrom, the arms of each of said pairs being of complementary shape with the outer ends approaching each other to within a distance less than the smallest dimension of the neck of any bottle adapted to be held and having the adjacent edges of the arms of each pair of a configuration to form a socket substantially conforming to the bottle neck to be held, a plastic flange section integrally formed with the body and arms and depending from each in a plane substantially perpendicular to the plane of the body and arms to provide lateral body and arm stiffness while retaining pliability to an extent sufficient to accommodate entry of a bottle within each formed socket, the lateral arm stiffness and rigidity providing a cantilever bottle-locating section adequately strong to support the weight of bottles so-positioned, a pair of bottle-contacting shoulders at spaced-apart regions along the depending flange-bounding adjacent edges of each formed bottle-gripping socket to provide bottle-wall support at spaced points along the bottle neck to be held, and integrally formed generally flat ribs extending from the main body within the flange-bounded region and in the direction of the flange for a distance no greater than the flange depth, the said ribs extending in criss-cross intersecting fashion between spaced portions of the depending flange for providing body stiffening.

6. The carrier claimed in claim 5 comprising, in addition, integrally formed stiffening ribs extending outwardly from the main body in the direction of the criss-cross ribs between the outer edges of the arms adapted for supporting different bottles, the said last named ribs intersecting at least a plurality of the first-named ribs to provide over all carrier strengthening.

7. A carrier for bottles of the cap-sealed type comprising a substantially flat, flexible and resilient main body, a plurality of pairs integrally formed arms of like characteristics each extending outwardly from the plane of the body, the arms of each pair being of generally concave periphery relative to each other and of substantially complementary shape and terminating as a pair of bottle gripping jaws facing each other with the outer edges spaced from each other by a distance less than the smallest dimension of the bottle size to be held and the combination forming an open ended bottle-receiving socket, each arm of the formed socket being resiliently distortable to accommodate a bottle forced therebetween, the concavity of the inner bottle-holding region of the socket being of such shape as to conform substantially to the neck of the bottle to be held, a flange section depending in a plane substantially perpendicular to the plane of both the body and the integrally formed arms to provide a stiffening for the body and cantilever arms while maintaining pliability and flexibility, and a bottle contacting collar at substantially the lower portion of the flange bounding each formed bottle-gripping socket and a bottle neck-contact edge at each of the upper portion and the flange to provide spaced bottle-wall lateral supports along the neck of the bottle to be held.

8. A carrier for bottles comprising a substantially flat, flexible and resilient main body, a plurality of pairs integrally formed arms each of like characteristics extending outwardly from the plane of the body, the arms of each pair being of complementarily concave shape to form bottle-receiving sockets each terminating as a pair of bottle gripping jaws facing each other and spaced from each other at the closest point by a distance less than the smallest dimension of the bottle neck to be held, each arm being resiliently distortable to accommodate a bottle forced therebetween, a flange section depending from the peripheral edges of both the body and the integrally formed arms and extending in a perpendicular direction to the body to stiffen the body and to transform the extending arms into substantially cantilever elements to support the weight of the arm-held bottle, while retaining the pliability, and a bottle locating-ring extending inwardly of the wall of each formed bottle-receiving socket at substantially the upper and lower portions of the wall flange thereof to provide a bottle wall-support at spaced points along the neck of the bottle to be held.

9. A carrier for bottles of the cap-sealed type comprising a substantially flat, flexible and resilient main body, a plurality of pairs integrally formed arms each of like characteristics extending outwardly in simulated cantilever fashion from the plane of the body, the arms of each pair being of complementary concave shape to form bottle-receiving sockets each terminating as a pair of bottle-wall locating and gripping jaws facing each other, said jaws having their arms spaced from each other at the closest point by a distance less than the smallest dimension of the bottle neck at its region of support to be held, each arm being resiliently distortable to accommodate a bottle forced therebetween, the arms thus forming a bottle receiving socket with an open bottle receiving end and an inner bottle-holding region, the inner bottle-holding region being of shape conforming substantially to the bottle neck, a flanged wall section depending from the peripheral edges of both the body and arms in a plane substantially perpendicular to the main body, the peripheral edge of the formed socket having a variable thickness which reaches a maximum substantially at the plane of the body and cross-ribs also formed integrally with the body and extending outwardly therefrom for a distance substantially coextensive with the flange depth in planes perpendicular to the body and in the direction of the integrally formed peripheral flanges substantially to transform the flexible and resilient body into a pliant substantially rigid body with the outwardly extending arms substantially full cantilever elements adapted to support the weight of bottles positioned within the formed sockets, and a bottle locating shoulder at substantially the upper and lower portions of the flange bounding each formed bottle gripping socket to provide bottle wall support at spaced points along the bottle to be held.

10. A carrier for bottles of the cap-sealed type comprising a substantially flat plastic sheet having a central main body and a plurality of pairs of arms extending outwardly therefrom, the adjacent contour of the arms of each pair being concave and of complementary shape terminating in spaced relationship to each other by a distance less than the smallest dimension of the bottle neck-size at the region whereat it is adapted to be held, a peripheral flange depending in a plane substantially perpendicular to the plane of both the body and the integrally formed arms to provide rigidity to both the body and arms, each arm being resiliently distortable to accommodate a bottle forced therebetween, the arms and flange walls forming cantilever-type bottle receiving sockets with an open bottle receiving end and an inner bottle-holding region, reinforcing cross-ribs also formed integrally with the body and extending outwardly therefrom in planes perpendicular thereto and in the direction of the peripheral flanges substantially to transform the flexible and resilient plastic sheet body into a pliant substantially rigid body with outwardly extending arms adapted to support the weight of bottles positioned within the formed sockets, and a bottle-locating shoulder at substantially the upper and lower portions of the flange bounding the concave portion of each formed bottle gripping socket to provide support for the bottle neck at spaced points.

11. The carrier claimed in claim 10 wherein the body has a bail-receiving opening formed therein at approximately its opposite ends and a support bail having its free ends protrude through the body openings and the bail handle extend between the openings and above the flat body surface, the bail handle between the protruding ends being longer than the distance between the openings and being adapted to be curved therebetween so that the outer ends of the carrier are supported by the bail when lifted.

12. The carrier claimed in claim 11 wherein the bail ends are loosely supported within the body member openings, and an enlargement at each free end of the bail of a size larger than the body opening to prevent ready withdrawal of the bail ends through the body openings.

13. A carrier for bottles of the cap-sealed type comprising a substantially flexible and resilient sheet forming a main generally rectangular shaped body and having a plurality of pairs of integrally formed arms extending outwardly from opposite sides of the long dimension of the rectangular shaped body in symmetrical arrangement on each side, the arms of each of the pairs being of complementary shape with adjacent edges concave with respect to each other and the outer ends approaching each other to within a distance less than the minimum diameter of the neck of a bottle adapted to be held, the concavity of the protruding arms forming a socket substantially conforming in shape to the bottle-neck to be held, an integrally formed flange depending in a plane substantially perpendicular to the plane of each of the body and the outwardly extending arms and from substantially the peripheral edges of each to provide lateral stiffness for the body and arms while retaining sufficient pliability at the outer edge of the arms to permit insertion of bottles into the formed sockets, the bottle arms being made sufficiently rigid by the flange reinforcement to become cantilever members extending out from main body to support the weight of a bottle positioned within the formed socket, and a multiplicity of rib members integrally formed with each of the body and the flanges and extending outwardly from the body in a direction substantially perpendicular to the plane thereof, and within the boundaries of the body, each rib extending between spaced apart regions of the flange so that the multiplicity of ribs criss-cross beneath the body and provide both lateral and longitudinal stiffness, the symmetry of the arm arrangement providing for holding at a maximum a like number of bottles on the carrier from opposite sides thereof.

14. The carrier claimed in claim 13 comprising, in addition, a bail loosely secured along the major axis of the body at points sufficiently remote from the center substantially to preclude bending of the body with each socket filled with a bottle.

15. In a bottle carrier, a body section, a plurality of pairs of normally flexible arms secured to the body and extending outwardly therefrom, the arms of each pair being concavely curved relative to each other to form an arcuately curved socket of a shape substantially corresponding to the cross-section of a bottle neck to be held, the outer ends of the arms of each pair being spaced from each other by a distance less than the neck diameter of a bottle adapted to be located in the formed socket, a reinforcing flange extending outwardly from the body about the peripheral edge of the concavely shaped arms in a direction substantially normal to the plane of the arms and body for reinforcing the arms and transforming the arm extensions into substantially rigid but pliable cantilever-type weight supporting arms, and a pair of bottle locating shoulder rings secured to the concavely curved reinforcing flange and having a radius of curvature less than that of the flange so as to hold and position the socket-supported bottle at two spaced planes on the bottle neck.

16. In a bottle carrier, a normally non-rigid body section, a plurality of pairs of normally flexible arms secured to the body periphery and extending outwardly therefrom, the arms of each pair being concavely curved relative to each other to form an arcuately curved socket of a shape substantially corresponding to the cross-section of a bottle neck to be held with the socket base substantially at the body edge, the outer ends of the arms of each pair being spaced from each other by a distance less than the neck diameter of a bottle adapted to be located in the formed socket, a reinforcing flange extending outwardly from the body about its peripheral edge and about the inner and outer peripheries of the concavely shaped arms in a direction normal to the plane of the body and arms for reinforcing the body and the outwardly extending arms and transforming the arm extensions into substantially rigid but pliable weight-supporting arms overhanging periphery of the body, and a pair of bottle support-locating shoulder rings secured to the inner edge of the inner arm-reinforcing flange, the said rings having a radius of curvature less than that of the flange so as to position the supported bottle at two spaced planes on the bottle neck.

17. A bottle carrier comprising a substantially planar flexible elongated body member, a plurality of pairs of substantially flat flexible arms extending outwardly from the body member and in the plane thereof, the arms of each pair being joined to the body member and spaced from each other at their outer ends by a distance less than the minimum diameter of a bottle thereby to be located, the said arms of each pair having their adjacent inner peripheries complementarily curved configuration and forming between the outer ends a continuous arcuate path having a radius of curvature approximating that of the smallest cross-section of the neck of a bottle in the neck-region to be held, stiffening flange extending outwardly from the body in a direction normal thereto and for substantially the complete body periphery for transforming the flexible body into a substantially rigid body, stiffening flange means also extending outwardly from the continuous arcuate inner periphery of the arms in a direction normal to the plane of the arms and joined to the body flange at approximately the center of the arc to transform the flexible arms into substantially rigid cantilever elements extending outwardly from the body, additional stiffening flange means extending from the outer edges of each arm from the outer end to the region of arm attachment to the body member and in a direction parallel to the inner flange to substantially the attachment region of the arm to the body for completing the arm reinforcement, and a pair of spaced retaining rings secured to the arcuate inner peripheral flange means extending outwardly from the arms, the retaining rings each having a radius of curvature less than that of the flange secured thereto whereby a bottle neck inserted through the opening between the arms to a position within the bottle-receiving socket formed by the curved inner flanges is supported against movement at two spaced planes along the bottle neck.

18. The carrier claimed in claim 17 comprising, in addition, a pair of support means secured to the body at substantially its opposite outer ends and adapted in supporting the body to exert a force thereon having a component which is substantially in the plane of the flange means.

19. A bottle carrier comprising an elongated body member, a plurality of pairs of non-rigid flexible arms extending outwardly from the body member and in the plane thereof, the arms of each pair being integral with the body member and spaced from each other at their outer ends by a distance less than the minimum diameter of a bottle neck at the region thereby to be located, the said arms of each pair having their adjacent inner peripheries of curved configuration and forming between the outer ends a continuous arcuate path having a radius of curvature approximating that of the smallest section of the neck of a bottle in the region to be held with the arc center substantially at the edge of the body member, stiffening flange means extending outwardly from the body in a direction normal thereto and for substantially the complete body periphery for substantially preventing body flexure, the curved flange and arms providing a bottle-receiving socket, stiffening flange means also extending outwardly from the continuous arcuate inner periphery of the arms and joined to the body flange at approximately the center of the arc to transform the flexible arms into substantially rigid cantilever elements extending outwardly from the body, additional stiffening flange means extending from the outer edges of each arm from the outer end to the region of attachment to the body member in a direction parallel to the inner flange and joined to the flange on the body periphery at substantially the attachment region of the arm for completing the arm reinforcement, and a pair of spaced retaining shoulder rings secured to the arcuate inner peripheral flange means extending outwardly from the arms, the retaining rings each having a radius of curvature less than that of the flange secured thereto whereby a bottle neck inserted through the opening between the arms to a position within the bottle-receiving socket formed by the curved inner flanges is supported against movement at two spaced planes along the bottle neck.

20. A carrier for supporting bottles at the uppermost neck-shoulder comprising a substantially flexible and resilient sheet forming a main body and having a plurality of pairs of arms extending outwardly therefrom, the arms of each of said pairs being of complementary shape with the outer ends approaching each other to within a distance less than the outer diameter of the bottle-neck at the region of the bottle shoulder adapted to be held, the adjacent edges of the arms of each pair being of a configuration to form a socket substantially conforming in shape to the bottle-neck adapted to be held, a flange section depending in a plane perpendicular to each of the body and the outwardly extending arms at approximately the peripheral edge thereof and extending inwardly of the socket formed by the outwardly extending arms to provide lateral stiffness, the said arms being pliant to an extent sufficient to accommodate entry of a bottle within each formed socket and being sufficiently rigidized by the flange that the arms become cantilever arms extending outwardly from the main body to support the weight of the bottle positioned within the socket, said body having a pair of bail-receiving openings formed therein at approximately its opposite ends and body-support means anchored beneath the plane of the body member and protruding through the openings for providing a lifting force at opposite ends of the carrier and thereby converting tension forces on the body surface, when the bottle-loaded carrier is lifted, into tension forces within the ribs and compression forces within the body.

21. A carrier for bottles of the type having an enlarged shoulder at their upper end comprising a substantially flexible resilient sheet forming a main body and having a plurality of pairs of integrally formed outwardly extending arms on opposite sides thereof, the arms of each of the pairs having their adjacent peripheral configurations of complementary concave shape with their outer ends approaching each other to within a distance less than the diameter of the bottle-neck at a region immediately below the bottle shoulder to form an open-ended bottle-receiving socket substantially conforming in shape to the bottle peripheral formation immediately below the shoulder to be held, a reinforcing flange formed integrally with the sheet and the arms and extending from substantially the sheet and arm peripheries in a direction normal to the plane of the sheet and arms to rigidize the outwardly extending arms and form them into cantilever members extending outwardly from the main body, a multiplicity of reinforcing intersecting ribs also integrally formed with the body and outer flange and extending in a direction outwardly from the body for substantially the same distance as the peripheral flange and in the same direction from the body to reinforce the body and provide tension members against the major forces resulting from bottle loading of the formed bottle-locating sockets and a pair of lifting means located on the body member, one lifting means being substantially at the outer portion of the body in the region of one of the outermost bottle-locating sockets and the other lifting means being at the opposite end of the body at a region substantially opposite the outermost bottle-locating socket at the other end of the body for converting the forces induced in the carrier, when bottle-loaded, into tension forces primarily in the reinforcing ribs and compression forces within the body.

22. A carrier for bottles of the type having an enlarged shoulder above the bottle-neck comprising a thin, flexible and resilient sheet forming a main body member and having a plurality of pairs of symmetrically located arms extending outwardly therefrom, the arms of each of the pairs being of complementary shape with their outer ends approaching each other and spaced at a distance less than the dimension of the bottle-neck immediately below the bottle-shoulder adapted to be held, adjacent edges of the arms of each pair being of a configuration to form a bottle-receiving socket substantially conforming in shape to the bottle-neck, a flange section depending from the peripheral edge of the body and the arms at approximately the peripheral edge thereof and in a direction substantially perpendicular to the plane of the body and arms to provide lateral and longitudinal stiffness, the said flange within the formed socket being tapered and having a wall thickness in the region of its merger with the main body which is thicker than at its open edge, a plurality of cross-connected ribs integrally formed with the body and extending in a direction substantially normal to the plane of the body, and arranged so that at least some ribs join the depending flanges, the ribs being disposed to provide tension members against the major carrying forces resulting from supporting bottles in the arm-formed sockets, and lifting means located at the outer regions of said body for converting the forces induced into the carrier when a bottle loading is applied into tension forces primarily in the ribs and compression forces within the body when a lifting force is applied.

References Cited in the file of this patent

UNITED STATES PATENTS

| | | |
|---|---|---|
| 2,161,855 | Copell | June 13, 1939 |
| 2,301,594 | Voigtritter | Nov. 10, 1942 |
| 2,420,191 | Ransom | May 6, 1947 |
| 2,446,670 | Shinkler, et al. | Aug. 10, 1948 |
| 2,508,945 | Heuer | May 23, 1950 |
| 2,518,823 | Schneider | Aug. 15, 1950 |
| 2,637,475 | Gianella | May 5, 1953 |
| 2,654,628 | Klante | Oct. 6, 1953 |
| 2,871,058 | Glazer | Jan. 27, 1959 |